Figure 1:
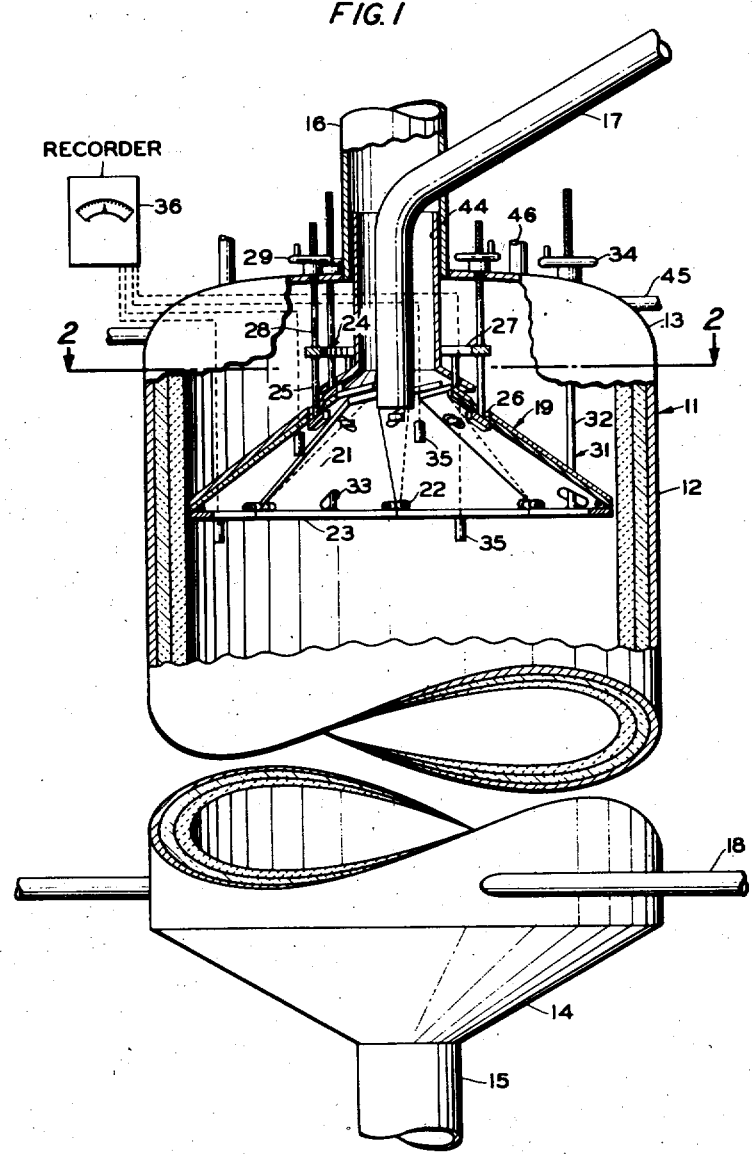

Aug. 28, 1951     D. S. HALL     2,565,811
PEBBLE HEATER BAFFLE

Filed Oct. 26, 1948     2 Sheets—Sheet 2

INVENTOR.
D. S. HALL
BY *Hudson and Young*
ATTORNEYS

Patented Aug. 28, 1951

2,565,811

UNITED STATES PATENT OFFICE 2,565,811

PEBBLE HEATER BAFFLE

Dick S. Hall, Bartlesville, Okla., assignor to Phillips Petroleum Company, a corporation of Delaware Application October 26, 1948, Serial No. 56,514

8 Claims. (Cl. 263—19)

This invention relates to improved pebble heater apparatus. In one of its more specific aspects, it relates to means for obtaining more efficient heat transfer between a fluid mass of pebbles and a gaseous heat exchange material. In another of its more specific aspects, it relates to an improved baffle for pebble chambers of pebble heater apparatus.

Thermal heating, treating or conversion processes which are carried out in so-called "pebble heater" apparatus utilize a flowing mass of solid heat exchange material, which mass is heated to a high temperature by passing a hot gaseous heat exchange material therethrough in a first direct heat exchange step. The heated solid heat exchange material is then caused to contact a second gaseous material for the purpose of furnishing heat thereto for the heating, treating or conversion of that second gaseous material. The conventional pebble heater apparatus generally comprises two chambers which may be disposed in substantially vertical aligment. The solid heat exchange material is admitted into the upper portion of a first or upper chamber of such an apparatus and forms a moving pebble bed therein. The solid heat exchange material in that moving pebble bed moves downwardly through the upper chamber in direct heat exchange with hot gaseous heat exchange material which is injected thereinto at the lower portion of the chamber. The solid heat exchange material is heated to a high temperature in that heat exchange and is then passed to the second or lower chamber through a connecting throat and forms a second moving pebble bed therein through which gaseous materials are passed countercurrently so as to heat thermally, treat or convert the gases in their contact with the heated pebbles.

Solid heat exchange material which is conventionally used in pebble heater apparatus may generally be termed "pebbles." The term "pebbles" as used herein denotes any solid refractory material of flowable size and form, having considerable strength and which is suitable to carry large amounts of heat from a pebble heater chamber to a gas heating chamber without rapid deterioration or substantial breakage. Pebbles conventionally used in pebble heater apparatus are substantially spherical in shape and range from about one-eighth inch to about one inch in diameter. In a high temperature process, pebbles having a diameter of between about one-fourth and about three-eighths inch are preferred. The pebbles may be formed of any refractory material which will withstand temperatures at least as high as the highest temperature attained in the pebble heating chamber and which materials will withstand the temperature changes to which they are subjected within the pebble heater apparatus. Refractory materials such as metal alloys, ceramics, or other satisfactory material may be utilized to form such pebbles. Silicon carbide, alumina, periclase, beryllia, stellite, zirconia, and mullite may be satisfactorily used to form such pebbles or may be used in admixture with each other, or with other materials. Pebbles formed of such materials, when properly fired, serve very well in high temperatures, some withstanding temperatures up to about 3500° F. Pebbles which are used may be either inert or catalytic as used in any selected process.

Many of the conventional pebble chambers of pebble heater apparatus utilize single outlets in their lower ends for withdrawing pebbles from the pebble bed within the pebble chamber. Pebbles within the pebble chamber tend to form stagnant zones containing stagnant pebbles. Such stagnant zones are generally confined to an area below an imaginary cone, the vertex angle of which is at the pebble outlet, the vertex angle being between 40° and 120°. This imaginary cone is limited by the angle of slip of the pebbles, which angle varies between about 30° and 70° and may be defined generally as the angle between a horizontal plane and the line of cleavage between stagnant and moving zones of pebbles as the pebbles are withdrawn through a constricted pebble outlet in the bottom of a pebble chamber. The exact angle of slip for any pebble chamber depends upon the size and shape of the pebbles and the depth of the pebble bed within the chamber. Gaseous heat exchange materials, which are injected into the lower portion of a pebble chamber containing a relatively deep pebble bed, tend to flow comparatively uniformly through the lower portion of the bed. Gas flow through the upper portion of the bed has been found to be at least partially dependent upon the shape of the top of the pebble bed. In those chambers in which pebbles are admitted axially to a relatively deep pebble bed, gas flow in the upper portion of the bed tends to take an outward turn. When more shallow pebble beds are utilized, i. e., where the pebble bed has a depth approaching 1.5 diameters or less, the gas flow tends to flow similarly to that in the upper portion of the deep pebble bed and to seek a channel through the outer periphery of the entire shallow pebble bed. From the above facts, it will be noted that the ratio of total gas flow through stagnant areas of a relatively shallow pebble bed to that of total gas flow through the moving portion of such a pebble bed is relatively large. In order to obtain the most efficient heat transfer between the solid and gaseous heat exchange materials, it is desirable to shift the preponderance of gas flow to the portion of the pebble bed which is maintained in a moving state.

An object of this invention is to provide means for regulating flow patterns of gaseous heat exchange material passing through a pebble chamber. Another object of the invention is to provide an improved method for accomplishing the most efficient heat transfer between solid and gaseous heat exchange material in a pebble chamber. Another object of the invention is to provide an improved pebble chamber. Another object is to provide an improved baffle for use in pebble chambers having a relatively small ratio of pebble bed depth to diameter. Other and further objects and advantages will be apparent upon study of the accompanying disclosure.

Figure 2:
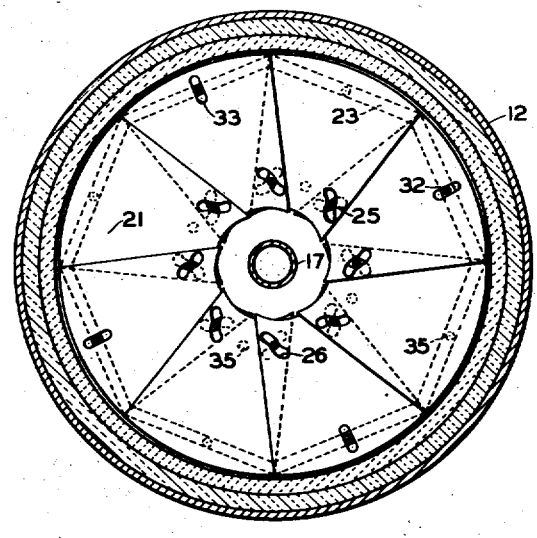
Figure 3:
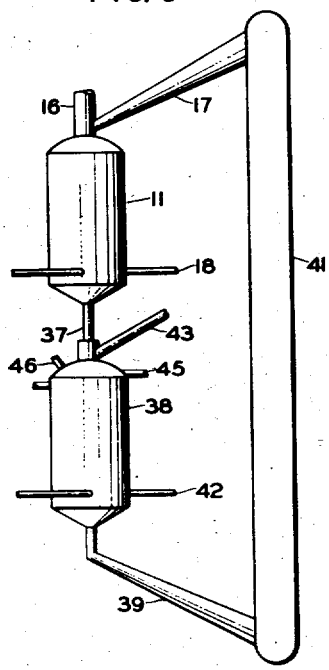

Understanding of the invention will be facilitated upon the reference to the diagrammatic drawings in which Figure 1 is a partial section elevation of a pebble chamber embodying the invention. Figure 2 is a horizontal section taken along line 2—2 of Figure 1. Figure 3 is a schematic view of a pebble heater apparatus embodying the invention.

In Figure 1, pebble chamber 11 comprises a closed outer shell 12 which is closed in its upper and lower ends by closure members 13 and 14, respectively. Shell 12 may be insulated by layers of refractory, or super refractory material, which will protect the metal shell from the high temperatures maintained within the pebble chamber. Pebble outlet conduit 15 is provided in the lower portion of closure member 14 and effluent outlet conduit 16 is provided, and preferably is centrally disposed in closure member 13. Pebble inlet conduit 17 extends through the wall of effluent outlet conduit 16 and extends axially into the upper portion of the chamber formed within shell 12. Gaseous heating material inlet conduits 18 are provided in the lower portion of shell 12. Baffle 19 comprises a plurality of wedge shaped, overlapping sections 21 which form a truncated cone extending from its lower periphery adjacent the insulated wall of shell 12 upwardly and inwardly about pebble inlet conduit 17 so as to form an annular effluent opening therein below effluent outlet conduit 16. Sections 21 are hinged or flexibly affixed by flexible fasteners 22 to a connecting support member 23 which may be in the form of a ring, or a strap forming a many-sided figure such as that shown by dotted lines in Figure 2 of the drawing. Inner adjusting means 24 comprises rigid suspension members 25 extending through slotted openings 26. Slotted openings 26 are provided in overlapping baffle sections 21 near their upper or inner ends. Each baffle section is provided with a slot 26 adjacent both of its lateral sides. When baffle sections 21 overlap, slots 26 in the overlapping portions also overlap to allow suspension member 25 to extend therethrough so as to support baffle sections 21 thereon. Suspension members 25 are affixed at their upper ends to header member 27, thus forming a rigid support member for the upper or inner end of the truncated conical baffle. Adjustment members 28 are affixed at their lower ends to header member 27 and extend upwardly through closure member 13 and are adjustably retained in place by fastener members 29 which make threaded communication with that portion of adjustment member 28 which extends through closure member 13. Outer adjusting means 31 comprises suspension members 32 which are affixed at their lower ends to connecting support member 23 and extend upwardly through openings 33 provided near the periphery of baffle 19. Suspension members 32 also extend upwardly through closure member 13 and are adjustably retained in place by fastener members 34 which make threaded communication with that portion of members 32 which extend through closure member 13.

Although fastener members 29 and 34 are shown as hand wheels in the drawing, use of automatic adjustment means is contemplated. Members 29 and 34 are replaced by pulley fastener members which make threaded communication with members 28 and 32. All of the pulley members are driven collectively by a single reversible motor, or pulley members attached to members 32 are driven collectively and pulley members attached to members 28 are also driven collectively as separate groups. Thermocouple members 35 are affixed to connecting support member 23 near the periphery of baffle 19 and baffle sections 21 near their upper or inner ends. Thermocouple members 35 communicate with recorder 36, which is also a controller when automatic operation is desired. The controller communicates with the motor drive means for the pulley fastener members.

In the operation of the device shown in Figure 1 of the drawing, pebbles are admitted into the chamber formed within insulated shell 12 through pebble inlet conduit 17. The pebbles flow downwardly and outwardly from pebble inlet conduit 17 and form a pebble bed within chamber 11, which pebble bed has a substantially cone shaped top. Gaseous heat exchange heat exchange materials are injected into chamber 11 through gaseous material inlet conduits 18. In those cases in which chamber 11 is utilized as a pebble heater chamber, the gaseous heat exchange material may be combustion gases or may be combustible material which may be burned in a separate combustion chamber within the lower portion of chamber 11, or in an annular combustion chamber about the lower portion of chamber 11, or may be burned in direct contact with the pebbles within chamber 11. The gaseous heat exchange material is passed upwardly through the downwardly flowing pebbles in chamber 11. Baffle 19 is spaced from the top of the pebble bed so as to relatively increase the pressure in that portion of the pebble bed near the wall of chamber 11. The gases are thus caused to flow inwardly through the moving mass of pebbles and as they escape from the top of the pebble bed, they pass upwardly through the annular effluent opening formed between baffle member 19 and pebble inlet conduit 17 and are removed from chamber 11 through effluent outlet conduit 16.

Baffle member 19 is ordinarily adjusted so that the slope of its sides substantially corresponds to the slope of the top of the pebble bed. The ratio of gas flow through the central portion of the pebble bed to that through the outer or peripheral portion of the pebble bed may be increased, however, by adjusting the baffle with relation to the top of the pebble bed so as to control the volume of gas flow through the space between the baffle and the pebble bed. This control may be accomplished by adjusting fastener means 34 so as to lower suspension members 32 and adjusting fastener members 29 so as to raise adjustment members 28 or by lowering members 28 and raising members 32. One edge of baffle 19 is generally fixed in horizontal relation with the lower lip of pebble conduit 17. Temperature measured by thermocouple members 35 is transmitted to recorder 36 where the temperature differential between the peripheral portion of the pebble bed and that closer to the axis of the chamber is measured. It is preferred in most cases to maintain the inner edge of baffle 19 in constant relation to the lower end of pebble conduit 17. If a temperature differential exists between the central and the peripheral portion of the pebble bed members 34 or substituted pulley fastener members are operated so as to lower the outer portion of baffle 19 into closer proximity to the top of the pebble bed so as to increase the flow of gas through the central portion of the pebble bed and decrease the temperature differential. If in a modified method of operation the peripheral edge of baffle 19 is maintained in a fixed relation with the outlet end of pebble inlet conduit 17 and a temperature differential exists, it is desirable to decrease that temperature differential. To accomplish that result members 29 or substituted pulley fastener members are operated so as to decrease the slope of baffle 19 and, by lowering the center portion of the baffle to a point in close proximity to the top of the pebble bed, increase the quantity of gas flow through the center part of the pebble bed.

In the device shown in Figure 3 of the drawing, pebbles are admitted to chamber 11 through pebble inlet conduit 17 and form a contiguous pebble mass therein which moves downwardly through chamber 11 and passes as a contiguous pebble stream through uninterrupted connecting throat 37 into gas heater chamber 38 in which the desired heating, treating, or conversion of the gaseous materials is accomplished. A contiguous stream of pebbles is removed from the bottom of chamber 38 through pebble outlet conduit 39 and is circulated by means of elevator means 41 to pebble inlet conduit 17. Gaseous heating material is injected into chamber 11 through gaseous material inlet conduit 18 and gaseous effluent material is removed from chamber 11 through effluent outlet conduit 16. Gaseous material to be heated in chamber 38 is injected thereinto through gaseous material inlet conduit 42 and the heated, treated, or converted gaseous material is removed from chamber 38 through effluent outlet conduit 43. Baffle member 19 is especially adaptable to pebble heater chambers, such as chamber 11. It may, however, be utilized in gas heating chambers, such as 38, when gas heating processes are being carried on within the pebble heater apparatus.

The apparatus described above may be further modified so that it may be efficiently utilized as a thermal hydrocarbon conversion chamber. In such chambers considerable coking is experienced as a result of a prolonged residence time of the reaction products in the upper portions of such chambers at conversion temperatures. The hydrocarbon materials over-crack under such conditions and form coke or carbon deposits on the chamber and in effluent outlet conduits. Coking in the effluent outlets increases the pressure drop through the chamber. The above described chamber may be modified by providing a sleeve 44, which is slidably retained within effluent outlet conduit 16 and extends downwardly to baffle member 19. The lower end of sleeve 44 may be flanged outwardly so as to rest on the upper surface of baffle 19. The sleeve would thus rise or fall as baffle member 19 is moved. Flushing gas inlets 45 and flushing gas outlets 46 may be provided in chamber 11 above baffle member 19. Steam or another inert gas may be injected into chamber 11 above baffle member 19 so as to flush the upper portion of the chamber, prevent passage of reaction products into that portion of the chamber, and so as to cool baffle member 19 and sleeve 44. The cooling which will be accomplished will depend upon the rate at which the inert gas is passed through the flushed portion of the system. The system may be operated by maintaining the inert gas in the upper portion of the chamber so as to prevent passage of reactant materials thereinto but without withdrawing a portion of it through outlets 46.

Pebble inlets and outlets of the devices shown in Figures 1, 2 and 3 of the drawing should be of such size that their diameters are at least 7 to 8 diameters of the pebbles. By maintaining this proportion of pebble conduit diameter to pebble diameter, bridging of the pebbles within the pebble conduits is substantially obviated. Pebble inlet conduit 17 may be adapted so as to be varied in length in any conventional manner. When the length of that conduit is varied the position of baffle 19 may be varied so as to maintain its constant horizontal relation with conduit 17.

As will be evident to those skilled in the art, various modifications of this invention can be made or followed in the light of the foregoing disclosure and discussions without departing from the spirit or scope of such disclosure.

I claim:
1. An improved pebble chamber of pebble heater apparatus which comprises in combination a closed outer shell; a pebble outlet in the lower end portion of said shell; a pebble inlet conduit centrally disposed in the upper end of said shell; an effluent outlet conduit concentrically disposed with said pebble inlet conduit; at least one heat exchange material inlet in the lower portion of said shell; and a variable pitch baffle within the upper portion of the chamber formed within said shell, said baffle being formed as a truncated cone extending from its periphery adjacent said shell upwardly about said pebble inlet conduit to form an annular passage therethrough for effluent materials.

2. The pebble chamber of claim 1, wherein said baffle comprises a plurality of overlapping sections flexibly connected at points adjacent their lower edges and lateral edges; and adjustment means to vary the slope and position of said baffle within said chamber.

3. The pebble chamber of claim 1, wherein said baffle comprises a plurality of wedge shaped overlapping sections flexibly connected at points adjacent their lower edegs and upper lateral edges; thermocouples depending from points adjacent the periphery of said baffle and points relatively near the central portion of said baffle; a temperature recorder communicating with said thermocouples; and adjustment means comprising a plurality of first suspension members operatively connected to said baffle relatively near its upper end to allow the upper ends of said baffle sections to overlappingly converge or extend, said first suspension members adjustably connected to the top of said shell, and second suspension members operatively connected to said baffle adjacent its periphery and adjustably connected to the top of said shell.

4. An improved pebble heater chamber of pebble heater apparatus which comprises in combination a closed outer shell containing a fluent contiguous mass of pebbles; a pebble outlet in the lower end portion of said shell; a pebble inlet conduit centrally disposed in the upper end of said shell; an effluent outlet conduit concentrically disposed with said pebble inlet conduit; at least one fluent heat exchange material inlet means in the lower portion of said shell; a baffle within the upper portion of the chamber formed within said shell, said baffle comprising a plurality of overlapping wedge shaped sections flexibly connected at their lower ends to at least one connecting-support member and forming a truncated cone extending from its periphery adjacent said shell upwardly and inwardly about said pebble inlet to form an annular passage therethrough for effluent materials; a plurality of thermocouples depending from points adjacent the periphery of said baffle and points relatively near the central portion of said baffle; a temperature recorder communicating with said thermocouples; inner adjusting means comprising first rigid suspension members extending through slotted openings in the overlapping portions of said baffle sections near their inner ends, a header member affixed to the upper ends of said rigid suspension members, adjustment members affixed to said header member at spaced intervals thereon and extending upwardly through the top of said closed shell, and first fastener members adjustably retaining said adjustment members in place; and outer adjusting means comprising second rigid suspension members affixed to said connecting-support member and extending upwardly through slotted openings in said baffle and through the upper portion of said closed shell, and second fastener members adjustably retaining said second rigid suspension members in place.

5. An improved method of operating a pebble heater chamber of pebble heater apparatus which comprises the steps of admitting pebbles axially into the upper portion of a pebble heater zone; passing said pebbles downwardly as a contiguous pebble bed through said pebble heater zone; passing hot gaseous heat exchange material upwardly through said pebble bed; suppressing the flow of said gaseous heat exchange material along the periphery of said pebble bed so as to increase the proportion of gas flow through the central portion of said bed in accordance with a temperature differential between central and peripheral portions of said bed; removing pebbles from the lower central portion of said pebble bed; and removing effluent material from the top center portion of said pebble heater zone.

6. The pebble chamber of claim 1, wherein a sleeve slidably retained in said effluent outlet and extends downwardly to rest on said baffle; and inert gas inlet in the upper portion of said shell above said baffle.

7. The pebble chamber of claim 1, wherein said baffle comprises a plurality of wedge shaped overlapping sections flexibly connected at points adjacent their lower edges and upper later edges; and adjustment means comprising a plurality of first suspension members operatively connected to said baffle relatively near its upper end to allow the upper ends of said baffle sections to overlappingly converge or extend, said first suspension members adjustably connected to the top of said shell, and second suspension members operatively connected to said baffle adjacent its periphery and adjustably connected to the top of said shell.

8. An improved pebble heater chamber of pebble heater apparatus which comprises in combination a closed outer shell containing a fluent contiguous mass of pebbles; a pebble outlet in the lower end portion of said shell; a pebble inlet conduit centrally disposed in the upper end of said shell; an effluent outlet conduit concentrically disposed with said pebble inlet conduit; at least one fluent heat exchange material inlet means in the lower portion of said shell; a baffle within the upper portion of the chamber formed within said shell, said baffle comprising a plurality of overlapping wedge shaped sections flexibly connected at their lower ends to at least one connecting-support member and forming a truncated cone extending from its periphery adjacent said shell upwardly and inwardly about said pebble inlet to form an annular passage therethrough for effluent materials; inner adjusting means comprising first rigid suspension members extending through slotted openings in the overlapping portions of said baffle sections near their inner ends, a header member affixed to the upper ends of said rigid suspension members, adjustment members affixed to said header member at spaced intervals thereon and extending upwardly through the top of said closed shell, and first fastener members adjustably retaining said adjustment members in place; and outer adjusting means comprising second rigid suspension members affixed to said connecting-support member and extending upwardly through slotted openings in said baffle and through the upper portion of said closed shell, and second fastener members adjustably retaining said second rigid suspension members in place.

DICK S. HALL.

REFERENCES CITED

The following references are of record in the file of this patent:

UNITED STATES PATENTS

| Number | Name | Date |
|---|---|---|
| 309,485 | Munzinger | Dec. 16, 1884 |
| 571,382 | Mayer | Nov. 17, 1896 |
| 1,383,984 | Clark | July 5, 1921 |
| 1,393,554 | Leonhardt | Oct. 11, 1921 |
| 1,669,012 | Nordstrom | May 8, 1928 |
| 2,432,503 | Bergstrom et al. | Dec. 16, 1947 |
| 2,436,254 | Eastwood et al. | Feb. 17, 1948 |
| 2,468,712 | Kohler | Apr. 26, 1949 |

FOREIGN PATENTS

| Number | Country | Date |
|---|---|---|
| 225,351 | Great Britain | Dec. 4, 1924 |

Certificate of Correction

Patent No. 2,565,811                                        August 28, 1951

DICK S. HALL

It is hereby certified that error appears in the printed specification of the above numbered patent requiring correction as follows:

Column 3, line 9, for "of the" read *of that*; column 4, line 43, strike out "heat exchange" second occurrence; column 6, line 65, for "edegs" read *edges*; column 8, line 2, for "later" read *lateral*;

and that the said Letters Patent should be read as corrected above, so that the same may conform to the record of the case in the Patent Office.

Signed and sealed this 18th day of December, A. D. 1951.

[SEAL]

THOMAS F. MURPHY,
*Assistant Commissioner of Patents.*